United States Patent
Lakshmanan et al.

(10) Patent No.: US 9,626,651 B2
(45) Date of Patent: Apr. 18, 2017

(54) AUTOMATED SOCIAL NETWORK INTRODUCTIONS FOR E-MEETINGS

(75) Inventors: Geetika T. Lakshmanan, Winchester, MA (US); Martin Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 13/117,065

(22) Filed: May 26, 2011

(65) Prior Publication Data

US 2012/0203845 A1 Aug. 9, 2012

Related U.S. Application Data

(63) Continuation-in-part of application No. 13/021,470, filed on Feb. 4, 2011.

(51) Int. Cl.
*G06Q 10/10* (2012.01)
*G06Q 50/00* (2012.01)

(52) U.S. Cl.
CPC .......... *G06Q 10/10* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 5,742,905 A | * | 4/1998 | Pepe et al. | 455/461 |
| 5,764,916 A | * | 6/1998 | Busey et al. | 709/227 |
| 5,769,616 A | * | 6/1998 | Mencarelli et al. | 417/486 |
| 5,870,672 A | * | 2/1999 | Stoddard | H04W 12/12 455/410 |
| 7,734,708 B1 | * | 6/2010 | Fletcher | 709/207 |
| 7,735,014 B2 | * | 6/2010 | Bergstrom et al. | 715/758 |
| 7,831,668 B2 | * | 11/2010 | Deeds | 709/206 |
| 7,979,802 B1 | * | 7/2011 | Appelman | 715/752 |
| 8,014,498 B2 | * | 9/2011 | Malik | 379/88.13 |
| 8,171,055 B2 | * | 5/2012 | Min et al. | 707/796 |
| 2005/0091118 A1 | * | 4/2005 | Fano | 705/26 |
| 2005/0171799 A1 | * | 8/2005 | Hull | G06Q 10/107 705/319 |
| 2005/0197101 A1 | * | 9/2005 | Gupta | H04L 29/1216 455/410 |

(Continued)

FOREIGN PATENT DOCUMENTS

WO WO2004061612 * 7/2004

*Primary Examiner* — Ninos Donabed
(74) *Attorney, Agent, or Firm* — Steven M. Greenberg, Esq.; CRGO Law

(57) ABSTRACT

Embodiments of the present invention provide a method, system and computer program product for automated social networking for e-meetings. In an embodiment of the invention, a method for automated social networking for e-meetings is provided. The method includes monitoring content provided to an e-meeting managed by an e-meeting server executing in memory of a host computer. The method further includes detecting a name in the monitored content and comparing the detected name to names in a contact list for a social networking system executing externally to the e-meeting. Finally, the method includes triggering generation of a social networking introduction for the name to different participants to the e-meeting in response to matching the detected name to a name in the contact list.

15 Claims, 1 Drawing Sheet

(56) References Cited

U.S. PATENT DOCUMENTS

| | | | |
|---|---|---|---|
| 2006/0005113 A1* | 1/2006 | Baluja et al. | 715/501.1 |
| 2006/0035658 A1* | 2/2006 | Yoon et al. | 455/518 |
| 2006/0106876 A1* | 5/2006 | MacGregor | 707/104.1 |
| 2006/0179114 A1* | 8/2006 | Deeds | 709/206 |
| 2006/0247999 A1* | 11/2006 | Gonen | G06Q 30/0261 705/37 |
| 2007/0130023 A1* | 6/2007 | Wolinsky et al. | 705/26 |
| 2007/0285505 A1* | 12/2007 | Korneliussen | 348/14.08 |
| 2009/0138941 A1* | 5/2009 | Monjas Llorente | H04L 63/0815 726/4 |
| 2009/0265429 A1* | 10/2009 | Gestsson | H04L 12/5835 709/204 |
| 2010/0070448 A1* | 3/2010 | Omoigui | 706/47 |
| 2010/0094837 A1* | 4/2010 | O'Sullivan | G06Q 10/107 707/705 |
| 2010/0125599 A1* | 5/2010 | Cheng | G06Q 30/02 707/771 |
| 2010/0161377 A1* | 6/2010 | Hines | G06Q 30/02 705/7.29 |

* cited by examiner

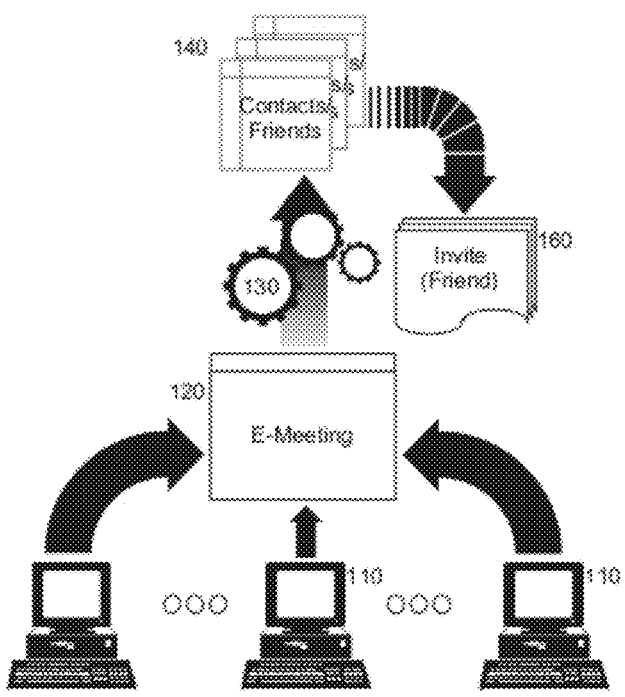
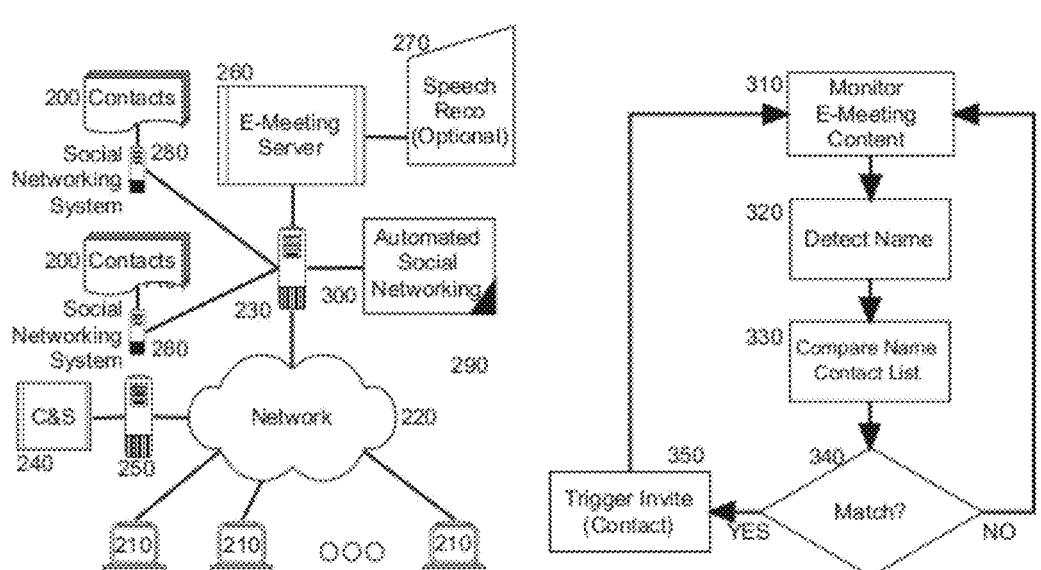
FIG. 1
FIG. 2
FIG. 3

AUTOMATED SOCIAL NETWORK INTRODUCTIONS FOR E-MEETINGS

CROSS-REFERENCE TO RELATED APPLICATIONS

This patent application claims the benefit under 35 U.S.C. §120 as a continuation-in-part of presently pending U.S. patent application Ser. No. 13/021,470, entitled AUTOMATED FOLLOW-UP FOR E-MEETINGS, filed on Feb. 4, 2011, the entire teachings of which are incorporated herein by reference.

BACKGROUND OF THE INVENTION

Field of the Invention

The present invention relates to the filed of e-meeting management and more particularly to social network integration with an e-meeting.

Description of the Related Art

An electronic meeting, hereinafter "e-meeting", in its broadest sense, is a collaboration between individuals that occurs electronically over a computer communications network. In a typical e-meeting, different individuals exchange messages through a computer interface to a common location. The most rudimentary form of an e-meeting is a discussion forum in which postings in a thread pertaining to a particular topic are provided serially in an asynchronous conversation. More advanced forms of an e-meeting provide for real-time exchanges of messages such as is the case in a chat room. E-meeting platforms combine multiple different collaborative technologies to emulate a "real", "live", "in-person" conference. Those technologies include audio and video conferencing over the Internet, instant messaging and chat room, polling, white boarding, and application sharing. Of note, the leading edge of e-meetings has found common ground with the virtual world platform in which participants to an e-meeting can be represented visually to other participants by way of an avatar and the venue for the e-meeting can be a simulated virtual environment.

E-meetings can range from just a few participants to hundreds if not thousands of participants. In the former circumstance, it is expected that all invited participants attend. In the latter circumstance, it is expected that a large number of invited participants will not attend. In either circumstance, but especially for the larger e-meetings, to accommodate those invited participants unable to attend an e-meeting, the entirety of the e-meeting can be "recorded" for later playback. Akin to a chat transcript, a recorded e-meeting is nothing more than the persistence of the different frames of the e-meeting broadcast to the participants in real time during the conduct of the e-meeting. Those frames include not just chat transcripts from ongoing chats during the e-meeting, but also images of screen sharing, white boarding and the like. Optionally, both audio and video data can be recorded for playback along with the frames.

During the course of an e-meeting, just as in the case of a traditional live meeting, participants can become introduced to one another. Further, during the course of an e-meeting, participants can share knowledge of known associates of potential interest who are not present at the e-meeting in a process known as networking. Social networking computing systems have refined the art of networking by suggesting introductions of new contacts based upon existing relationships, or known interests in a user profile. In an e-meeting, however, the process of social networking remains a manual exercise requiring the participants to recall a mentioned person for subsequent addition to a social network as part of a follow-up action.

BRIEF SUMMARY OF THE INVENTION

Embodiments of the present invention address deficiencies of the art in respect to social networking integration for e-meetings and provide a novel and non-obvious method, system and computer program product for automated social networking for e-meetings. In an embodiment of the invention, a method for automated social networking for e-meetings is provided. The method includes monitoring content provided to an e-meeting managed by an e-meeting server executing in memory of a host computer. The method further includes detecting a name in the monitored content and comparing the detected name to names in a contact list for a social networking system executing externally to the e-meeting. Finally, the method includes triggering generation of a social networking introduction for the name to different participants to the e-meeting in response to matching the detected name to a name in the contact list.

In one aspect of the embodiment, monitoring content provided to an e-meeting comprises speech recognizing audio provided to the e-meeting into textual content and monitoring the textual content speech recognized from the audio. In other aspects of the embodiment, comparing the detected name to names in a contact list for a social networking system executing externally to the e-meeting, includes comparing the detected name to names in different contact lists for respectively different social networking systems, or to names in different contact lists for respectively different participants to the e-meeting for a corresponding social networking system meeting. In yet other aspects of the embodiment, triggering generation of a social networking introduction for the name to different participants to the e-meeting in response to matching the detected name to a name in the contact list, includes triggering generation of a social networking introduction for the name to different participants to the e-meeting in response to matching the detected name to a name in contact lists for a threshold number of ones of the respectively different social networking systems, or for a threshold number of the participants to the e-meeting.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for automated social networking for e-meetings;

FIG. 2 is a schematic illustration of an e-meeting data processing system configured for automated social networking for e-meetings; and, FIG. 3 is a flow chart illustrating a process for automated social networking for e-meetings.

DETAILED DESCRIPTION OF THE INVENTION

Embodiments of the invention provide for automated social networking for e-meetings. In accordance with an embodiment of the invention, content in an e-meeting such as that occurring by way of a Web conference or virtual conference in a virtual world, can be monitored. Textual content arising during the e-meeting can be analyzed to identify one or more names. Each identified name can be compared to at least one data store of contacts for a corresponding social network. When a match occurs between a name and an entry in a data store of a corresponding social network, an invite can be triggered for the matching entry to one or more participants to the e-meeting. In this way, social networking introductions can be automatically generated relevant to the e-meeting without requiring end user intervention.

In further illustration, FIG. 1 pictorially shows a process for automated social networking for e-meetings. As shown in FIG. 1, different end users 110 can participate in an e-meeting 120 through respective computers. Participation in the e-meeting 120 by the end users 110 can include exchanges of instant messages in a chat session, providing audio input in an audio conference portion of the e-meeting 120, or video input in a video conference portion of the e-meeting, sharing a document through application sharing, engaging in white boarding and the like. Consequently, content can be provided by the end users 110 through the e-meeting 120. Automated social networking logic 130 can monitor the content provided by the end users 110 in the e-meeting 120 and can detect names in the content.

In response to detecting a name in the content, the social networking logic 130 can compare the detected name to one or contact lists 140 for one or more correspondingly different social networking systems. In this regard, the detected name can be the subject of a general search query to one or more social networking systems, or the detected name can be the subject of a search query to the contact lists 140 of one or more of the different end users 110 for respective social networking accounts in correspondingly different social networking systems. To the extent that the detected name matches a contact in the lists of contacts 140, an invite 160 can be triggered for the detected name and one or more of the different end users 110, for example depending upon a privacy setting for each of the different end users 110 permitting the automated generation of a social networking invite, or depending upon the detected name appearing in a threshold number of contact lists 140 for the different end users 110 participating in the e-meeting 120.

The process described in connection with FIG. 1 can be implemented in an e-meeting data processing system. In a further illustration, FIG. 2 schematically shows an e-meeting data processing system configured for automated follow-up for e-meetings. The system can include a host server 230 with at least one processor and memory configured for communicative coupling to different end user computing devices 210 over a computer communications network 220. The host server 230 can support the execution in memory of an e-meeting server 260, for example a Web conferencing system or a virtual world platform coupled to a calendaring and scheduling (C&S) system 240 supported by a second host server 250, the C&S system 240 managing scheduling of different e-meetings by the e-meeting server 260. Optionally, a speech recognition system 270 can be included with the e-meeting server 260 to produce text from audio speech provided to the e-meeting server 260 as part of an audio conference.

An automated social networking module 300 can be coupled to the e-meeting server 260. The automated social networking module 300 can include program code that when executed in memory of the host server 230 can monitor content provided through end user computing devices 210 by different participants to an e-meeting managed by the e-meeting server 260. The program code when executed further can detect in the monitored content a name and can compare the name to one or more contact lists 200 for respectively different social networking systems 280 communicatively linked to the host server 230. In response to matching the detected name to a name in the contact lists 200, the program code of the automated social networking module 300 can trigger the generation and transmission of a social networking invite for the detected name to one or more of the participants of the e-meeting.

In more particular illustration of the operation of the logic of the automated social networking module 300, FIG. 3 is a flow chart illustrating a process for automated social networking for e-meetings. Beginning in block 310, e-meeting content 310 can be detected. In this regard, textual content in one or more applications of the e-meeting, such as a chat application, white boarding session, applications sharing session, or presentation session can be parsed on a term by term basis. In block 320, a name can be detected in the content. In block 330, the detected name can be compared to names in a contact list for a corresponding social network. For example, the detected name can be compared to the contact lists of a social networking system for each participant to the e-meeting, or the detected name can be the subject of a general query to the social networking system irrespective of the identity of the different participants to the e-meeting. Further, the detected name can be compared to multiple different contact lists for correspondingly different social networking systems.

In decision block 340, if a match occurs between the detected name and a name in one or more of the contact lists, in block 350, a social networking invitation to "connect" or "friend" or "follow" for the detected name can be generated and transmitted to one or more of the participants to the e-meeting. For instance, the social networking invitation can be triggered for a participant to the e-meeting when permitted by the privacy settings of the participant, or when the detected name appears in a threshold number of contact lists of other participants to the e-meeting, or a threshold number of social networking systems for which corresponding contact lists had been compared to the detected name. Thereafter, the process can return to block 310 with additional content of the e-meeting being monitored for names.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for automated social networking for e-meetings, the method comprising:
    monitoring content provided by different participants to an e-meeting managed by an e-meeting server executing in memory of a host computer by speech recognizing audio provided to the e-meeting into textual content and monitoring the textual content speech recognized from the audio;
    detecting a name in the monitored content;
    comparing the detected name to names in a contact list for a social networking system executing externally to the e-meeting, the social networking system suggesting introductions of new contacts to end users of the social networking system based upon existing relationships of the end users; and,
    triggering generation of a social networking introduction for the name to each of the different participants to the e-meeting in a social networking system to which each of the different participants belong, in response to matching the detected name to a name in the contact list.

2. The method of claim 1, wherein comparing the detected name to names in a contact list for a social networking system executing externally to the e-meeting, comprises comparing the detected name to names in different contact lists for respectively different social networking systems each executing externally to the e-meeting.

3. The method of claim 1, wherein comparing the detected name to names in a contact list for a social networking system executing externally to the e-meeting, comprises comparing the detected name to names in different contact lists for respectively different participants to the e-meeting for a corresponding social networking system executing externally to the e-meeting.

4. The method of claim 2, wherein triggering generation of a social networking introduction for the name to different participants to the e-meeting in response to matching the detected name to a name in the contact list, comprises triggering generation of a social networking introduction for the name to different participants to the e-meeting in response to matching the detected name to a name in contact lists for a threshold number of ones of the respectively different social networking systems.

5. The method of claim 3, wherein triggering generation of a social networking introduction for the name to different participants to the e-meeting in response to matching the detected name to a name in the contact list, comprises triggering generation of a social networking introduction for the name to different participants to the e-meeting in response to matching the detected name to a name in contact lists for a threshold number of the participants to the e-meeting.

6. An e-meeting data processing system configured for automated follow-up for e-meetings, the system comprising:
    an e-meeting server executing in memory of a host computer and managing an e-meeting attended by a plurality of e-meeting participants; and
    an automated social networking module coupled to the e-meeting server, the module comprising program code enabled to monitor content provided to the e-meeting by different participants by speech recognizing audio provided to the e-meeting into textual content and monitoring the textual content speech recognized from the audio, to detect a name in the monitored content, to compare the detected name to names in a contact list for a social networking system executing externally to the e-meeting, the social networking system suggesting introductions of new contacts to end users of the social networking system based upon existing relationships of the end users, and to trigger generation of a social networking introduction for the name to each of the different participants to the e-meeting in a social networking system to which each of the different participants belong, in response to matching the detected name to a name in the contact list.

7. The system of claim 6, wherein the program code of the module compares the detected name to names in different contact lists for respectively different social networking systems each executing externally to the e-meeting.

8. The system of claim 6, wherein the program code of the module compares the detected name to names in different contact lists for respectively different participants to the e-meeting for a corresponding social networking system executing externally to the e-meeting.

9. The system of claim 7, wherein the program code of the module triggers generation of a social networking introduction for the name to different participants to the e-meeting in response to matching the detected name to a name in contact lists for a threshold number of ones of the respectively different social networking systems.

10. The system of claim 8, wherein the program code of the module triggers generation of a social networking introduction for the name to different participants to the e-meeting in response to matching the detected name to a name in contact lists for a threshold number of the participants to the e-meeting.

11. A computer program product for automated social networking for e-meetings, the computer program product comprising:
    a non-transitory computer readable storage medium having computer readable program code embodied therewith, the computer readable program code comprising:
    computer readable program code for monitoring content provided by different participants to an e-meeting managed by an e-meeting server executing in memory of a host computer by speech recognizing audio provided to the e-meeting into textual content and monitoring the textual content speech recognized from the audio;
    computer readable program code for detecting a name in the monitored content;
    computer readable program code for comparing the detected name to names in a contact list for a social networking system executing externally to the e-meeting, the social networking system suggesting introductions of new contacts to end users of the social networking system based upon existing relationships of the end users; and,
    computer readable program code for triggering generation of a social networking introduction for the name to each of the different participants to the e-meeting in a social networking system to which each of the different participants belong, in response to matching the detected name to a name in the contact list.

12. The computer program product of claim 11, wherein the computer readable program code for comparing the detected name to names in a contact list for a social networking system executing externally to the e-meeting, comprises computer readable program code for comparing the detected name to names in different contact lists for respectively different social networking systems each executing externally to the e-meeting.

13. The computer program product of claim 11, wherein the computer readable program code for comparing the detected name to names in a contact list for a social networking system executing externally to the e-meeting, comprises computer readable program code for comparing the detected name to names in different contact lists for respectively different participants to the e-meeting for a corresponding social networking system executing externally to the e-meeting.

14. The computer program product of claim 12, wherein the computer readable program code for triggering generation of a social networking introduction for the name to different participants to the e-meeting in response to matching the detected name to a name in the contact list, comprises computer readable program code for triggering generation of a social networking introduction for the name to different participants to the e-meeting in response to matching the detected name to a name in contact lists for a threshold number of ones of the respectively different social networking systems.

15. The computer program product of claim 13, wherein the computer readable program code for triggering generation of a social networking introduction for the name to different participants to the e-meeting in response to matching the detected name to a name in the contact list, comprises computer readable program code for triggering generation of a social networking introduction for the name to different participants to the e-meeting in response to matching the detected name to a name in contact lists for a threshold number of the participants to the e-meeting.

* * * * *